US009866745B2

United States Patent
Kao et al.

(10) Patent No.: US 9,866,745 B2
(45) Date of Patent: Jan. 9, 2018

(54) IMAGE CAPTURING DEVICE AND HYBRID AUTO-FOCUS METHOD THEREOF

(71) Applicant: HTC Corporation, Taoyuan (TW)

(72) Inventors: Yu-Kai Kao, Taoyuan (TW); Chi-Kuan Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/187,802

(22) Filed: Jun. 21, 2016

(65) Prior Publication Data
US 2017/0017136 A1 Jan. 19, 2017

Related U.S. Application Data

(60) Provisional application No. 62/192,057, filed on Jul. 13, 2015.

(51) Int. Cl.
*H04N 5/232* (2006.01)
*H04N 13/02* (2006.01)
*G03B 13/20* (2006.01)
*G03B 13/36* (2006.01)

(52) U.S. Cl.
CPC ......... *H04N 5/23212* (2013.01); *G03B 13/20* (2013.01); *G03B 13/36* (2013.01); *H04N 13/0271* (2013.01); *H04N 13/0239* (2013.01)

(58) Field of Classification Search
None
See application file for complete search history.

(56) References Cited

U.S. PATENT DOCUMENTS

| 6,108,495 | A | 8/2000 | Takahata et al. |
| 2004/0202461 | A1 | 10/2004 | Nakahara |
| 2007/0279516 | A1 | 12/2007 | Ishii |
| 2010/0002128 | A1* | 1/2010 | Ishii ........................ G03B 3/00 348/349 |

(Continued)

FOREIGN PATENT DOCUMENTS

| TW | 201344327 | 11/2013 |
| TW | 201401861 | 1/2014 |

OTHER PUBLICATIONS

"Office Action of Taiwan Counterpart Application," dated Mar. 28, 2017, p. 1-p. 4.

(Continued)

*Primary Examiner* — Justin P Misleh
(74) *Attorney, Agent, or Firm* — JCIPRNET

(57) ABSTRACT

The disclosure proposes an auto-focus method and an image capturing device including a distance sensor and an image sensor having a lens and a sensing array. The method includes the following steps. First, distance sensor data and phase detection data are respectively obtained from the distance sensor and the sensing array. The lens is controlled to perform a course search within a focusing range by switching between a distance sensor auto-focus mode and a phase detection auto-focus mode based on the distance sensor data and the phase detection data so as to determine a fine-search range. The lens is further controlled to perform a fine search within the fine-search range in a contrast detection auto-focus mode so as to determine an optimal focusing lens position. Next, the lens is controlled to move to the optimal focusing lens position.

19 Claims, 7 Drawing Sheets

(56) References Cited

U.S. PATENT DOCUMENTS

| | | | | |
|---|---|---|---|---|
| 2011/0058097 | A1* | 3/2011 | Mizuo | G03B 13/20 |
| | | | | 348/350 |
| 2012/0147150 | A1 | 6/2012 | Kojima et al. | |
| 2012/0154670 | A1 | 6/2012 | Hamamura | |
| 2013/0070148 | A1 | 3/2013 | Kim | |
| 2016/0266467 | A1* | 9/2016 | Lou | G02B 7/285 |
| 2016/0295097 | A1* | 10/2016 | Shanmugavadivelu | H04N 5/2254 |

OTHER PUBLICATIONS

Wikipedia, "Autofocus" Jul. 3, 2015, Available at: https://en.wikipedia.org/w/index.php?title=Autofocus&oldid=669739523.

"Office Action of Europe Counterpart Application", dated Apr. 5, 2017, p. 1-p. 16.

* cited by examiner

IMAGE CAPTURING DEVICE AND HYBRID AUTO-FOCUS METHOD THEREOF

CROSS REFERENCE TO RELATED APPLICATION

This application claims the priority benefit of U.S. provisional application Ser. No. 62/192,057, filed on Jul. 13, 2015. The entirety of the above-mentioned patent application is hereby incorporated by reference herein and made a part of specification.

TECHNICAL FIELD

The disclosure relates to is directed to an image capturing device and an auto-focus (AF) method thereof.

BACKGROUND

As a digital camera has become small, compact, and inexpensive, consequently, the digital camera could be embedded in handheld electronic devices such as cellular phones, smart phones, tablet computers, personal digital assistants and so forth. The diminutive nature of such camera allows the camera to become a convenient and popular additional feature of portable consumer electronic devices. However, the portability of such electronic devices may have prevented many more sophisticated uses or structures to be included for such cameras. For example, fixed focal length lenses and small sensors would typically be used for such cameras since an optical zoom lens may be too heavy and require more physical depths than the body of the handheld electronic device would permit, and yet the speed of an auto-focus procedure is highly dependent on the maximum aperture offered by the lens. Therefore, there is a need for an effective auto-focus method for such handheld electronic device.

SUMMARY OF THE DISCLOSURE

Accordingly, the disclosure is directed to an image capturing device and an auto-focus method thereof, where a hybrid auto-focus method is proposed for efficiently speed up the auto-focus procedure so as to greatly enhance user experience.

According to one of the exemplary embodiments, an auto-focus method of an image capturing device including a distance sensor and an image sensor having a lens and a sensing array is proposed. The method includes the following steps. First, distance sensor data (DS data) and phase detection data (PD data) are respectively obtained from the distance sensor and the sensing array. The lens is controlled to perform a coarse search within a focusing range by switching between a distance sensor auto-focus (DSAF) mode and a phase detection auto-focus (PDAF) mode based on the DS data and the PD data so as to determine a fine-search range. The lens is further controlled to perform a fine search within the fine-search range in a contrast detection auto-focus (CDAF) mode so as to determine an optimal focusing lens position. Next, the lens is controlled to move to the optimal focusing lens position.

According to one of the exemplary embodiments, an image capturing device is proposed. The image capturing device includes an image sensor having a lens and a sensing array coupled to each other, a distance sensor, a memory, and a processor, where the processor is coupled to the image sensor, the distance sensor, and the memory. The processor is configured to obtain DS data and PD data respectively from the distance sensor and the sensing array, control the lens to perform a coarse search within a focusing range by switching between a DSAF mode and a PDAF mode based on the DS data and the PD data so as to determine a fine-search range, control the lens to perform a fine search within the fine-search range in a CDAF mode so as to determine an optimal focusing lens position, and control the lens to move to the optimal focusing lens position.

According to one of the exemplary embodiments, another auto-focus method of an image capturing device including a distance sensor and two image sensors are proposed, where each of the image sensors includes a lens and a sensing array. The method includes the following steps. First, DS data is obtained from the distance sensor and disparity data (PD data) is obtained according to the sensing arrays of the image sensors. The lenses are controlled to perform a coarse search within a focusing range by switching between a DSAF mode and a disparity detection auto-focus (DDAF) mode based on the DS data and the DD data so as to determine a fine-search range. The lenses are further controlled to perform a fine search within the fine-search range in a CDAF mode so as to determine an optimal focusing lens position. Next, the lenses are controlled to move to the optimal focusing lens position.

In view of the aforementioned descriptions, the collaboration of the two auto-focus modes based on the data obtained from the distance sensor and the sensing array would enable the lens to scan through the entire focusing range with larger steps. Once the fine-search range in which an optimal-focusing lens position is located, the lens is controlled to search for the optimal focusing lens position with smaller steps. The proposed hybrid auto-focus method is used for efficiently speed up the auto-focus procedure so as to greatly enhance user experience.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
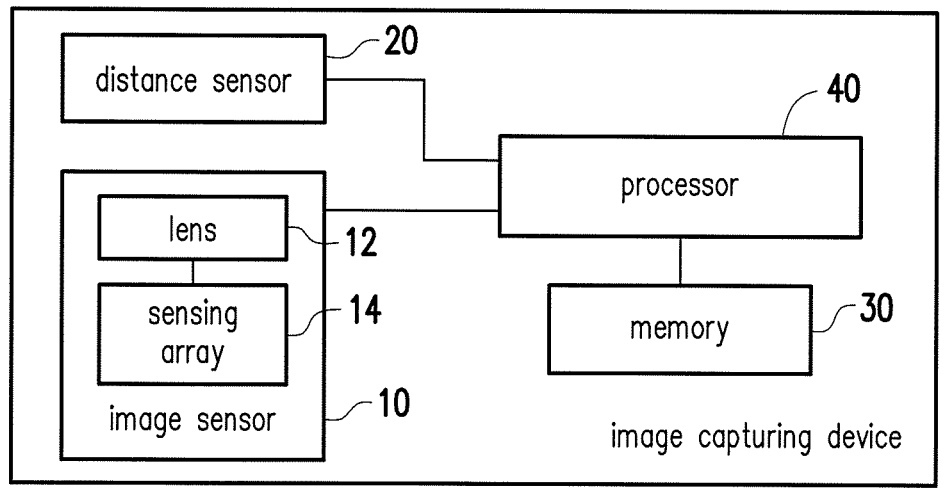
FIG. 1 illustrates a schematic diagram of an image capturing device according to an exemplary embodiment of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of an image capturing device in accordance with one of the exemplary embodiments of the disclosure. All components of the image capturing device and their configurations are first introduced in FIG. 1. The functionalities of the components are disclosed in more detail in conjunction with FIG. 3.

Referring to FIG. 1, for exemplary purposes, the image capturing device 100 could be a digital camera, a digital camcorder, a digital single lens reflex camera or other devices provided with an image capturing feature such as a smart phone, a tablet computer, a personal digital assistant, and so on. The image capturing device 100 may include at least one image sensor 10, a distance sensor 20, a memory 30, and a processor 40, where the image sensor 10, the distance sensor 20, and the memory 30 are respectively coupled to the processor 40. In the present exemplary embodiment, only one image sensor will be illustrated for simplicity.

The image sensor 10 would include a lens 12 and a sensing array 14. The sensing array 14 may be charge-coupled-device (CCD) elements, complementary metal-oxide semiconductor (CMOS) elements, and yet the disclosure is not limited herein. An image captured by the lens 12 would be imaged onto the sensing array 14. The image formed on the sensing array 14 would be converted to digital signals, and the digital signals would be output to the processor 40.

Figure 2:
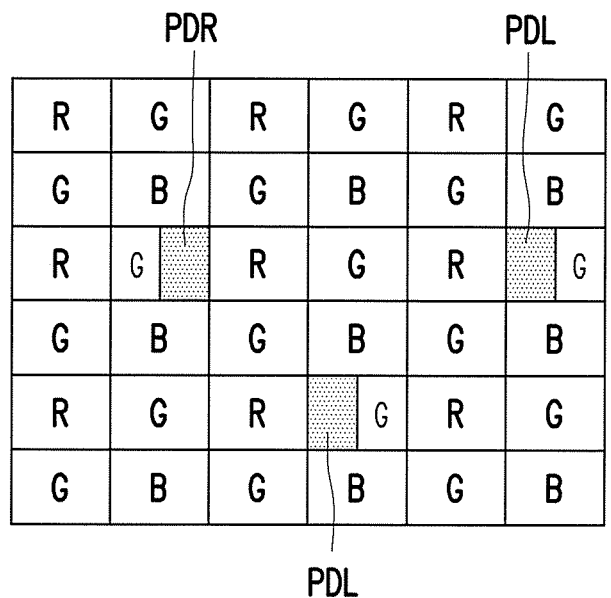
FIG. 2 illustrates a sensing array in accordance with one of the exemplary embodiments of the disclosure.

The sensing array 14 include a plurality of pixels arranged in an array. In the present exemplary embodiment, some pixels are configured as phase detection pixels, where each of the phase detection pixels is partially-shielded for phase detection during an auto-focus process. For example, as illustrated in FIG. 2, the pixels of the sensing array 14 would be arranged in Bayer pattern with R, G, and B pixels. Herein, some of the G pixels are partially replaced by phase detection pixels including left-shielded pixels PDL and right-shielded pixels PDR. An offset between each of the left-shielded pixels PDL and its corresponding right-shielded pixel PDR is referred to as "phase difference", where the phase difference is proportional to the distance from an in-focus position (also known as "defocus distance").

The distance sensor 20 may be infrared, ultrasonic, or laser sensors for measuring the distance between a target object and the image sensor 10.

The memory 30 may be one or a combination of a stationary or mobile random access memory (RAM), a read-only memory (ROM), a flash memory, a hard drive or other various forms of non-transitory, volatile, and non-volatile memories.

The processor 40 may be, for example, a central processor (CPU) or other programmable devices for general purpose or special purpose such as a microprocessor, a digital signal processor (DSP), a graphical processor (GPU), a programmable controller, an application specific integrated circuit (ASIC), a programmable logic device (PLD) or other similar or a combination of aforementioned components.

Figure 3:
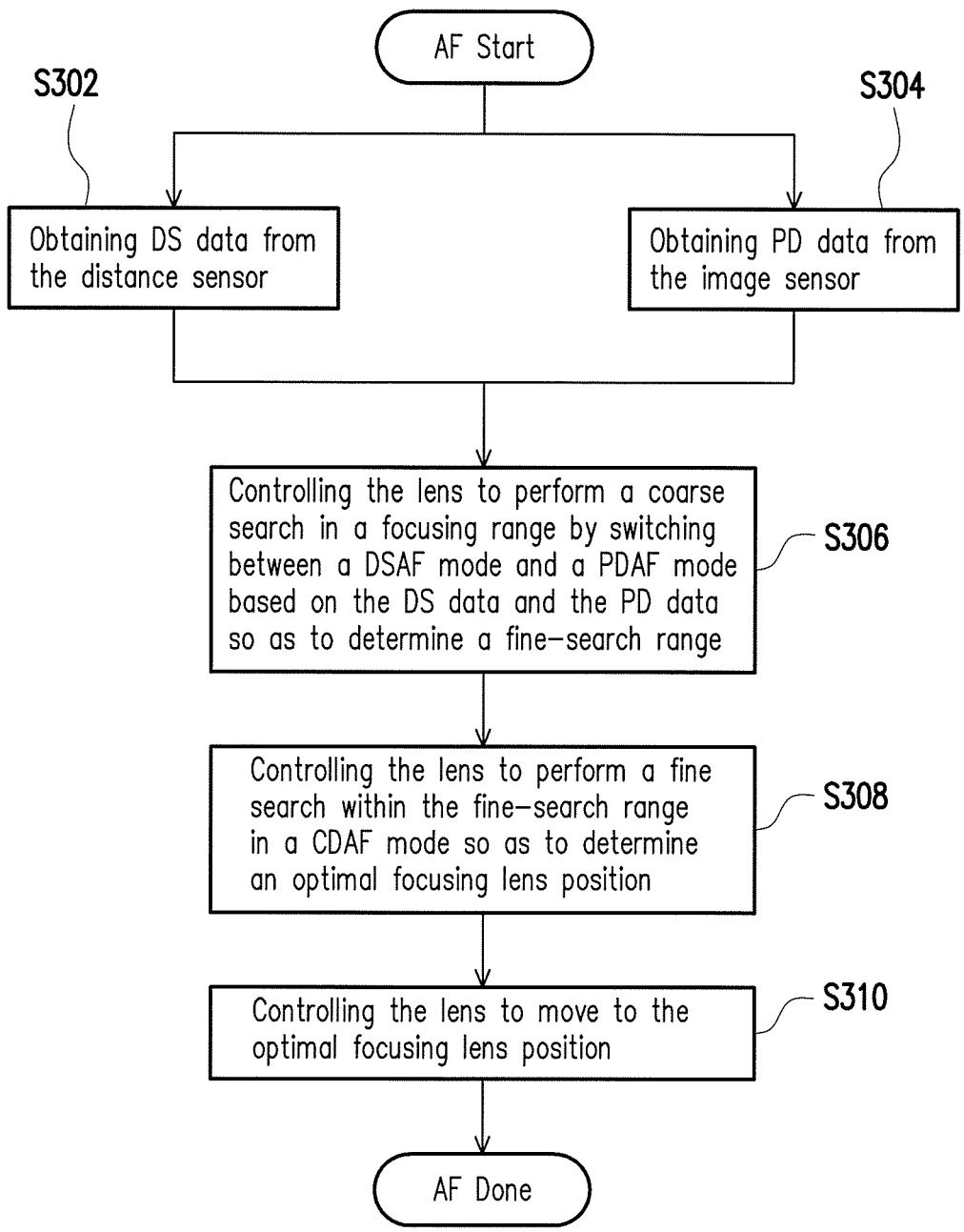
FIG. 3 illustrates a flowchart of an auto-focus method in accordance with one of the exemplary embodiments of the disclosure.

FIG. 3 illustrates a flowchart of an auto-focus method in accordance with one of the exemplary embodiments of the disclosure. The steps of FIG. 3 could be implemented by the proposed image capturing device 100 as illustrated in FIG. 1. For exemplary purposes, an infrared sensor would be the distance sensor 20 hereinafter.

Referring to FIG. 3, after an auto-focus process is initiated, the processor 40 obtains distance sensor data (DS data) from the distance sensor 20 (Step S302) and phase detection data (PD data) from the image sensor 10 (Step S304). To be specific, when the user of the image capturing device 100 wishes to take an image of a target scene and presses on an image capturing trigger, the processor 40 would control the distance sensor 20 to emit infrared light toward a target object in the target scene and receive the reflected infrared light from the target object and thereby obtain the DS data. The DS data may include a measured distance between the distance sensor 20 and the target object (referred to as "an object distance" hereinafter) as well as a surface reflectance of the target object (referred to as "an object reflectance" hereinafter). Concurrently, the processor 40 would obtain the PD data corresponding to the phase detection pixels of the sensing array 14. The PD data may include a phase difference value (PD value) and a confidence level. The PD value describes an offset between a left-shielded pixel and its corresponding right-shielded pixels, and the confidence level is a reference index in proportion to the number of easy-to-detect phase difference vertical edge inside an auto-focus window.

The DS data and the PD data are used as auxiliary information for speeding up the entire auto-focus process. That is, the processor 40 controls the lens 12 to perform a coarse search within a focusing range by switching the image sensor 10 between a distance sensor auto-focus (DSAF) mode and a phase detection auto-focus (PDAF) mode based on the DS data and the PD data so as to determine a fine-search range (Step S306). The DSAF mode corresponding to the distance sensor 20 may work efficiently and provide precise measurement for a short-distance target object. On the other hand, the PDAF mode corresponding to the phase detection pixels of the image sensor 10 may be relatively suitable for a long-distance target object since the PD value between the phase detection pixels are more comparable. The collaboration of the two auto-focus modes would enable the lens 12 to scan through the entire focusing range with large steps to first determine the coarse-search focusing position and then identify the fine-search range in which an optimal-focusing lens position is located according to the coarse-search focusing position.

After the fine-search range is determined, the processor 40 would control the lens 12 to perform a fine search within the fine-search range in a contrast detection auto-focus (CDAF) mode so as to determine an optimal focusing lens position (Step S308). Next, the processor 40 would control the lens 12 to move to the optimal focusing lens position (Step S310), and the AF process is then completed. In the CDAF mode, the optimal focusing lens position represents a lens position where the contrast of a frame appears to be the peak or the maximum value. CDAF is relatively slower than PDAF or DSAF since multiple frame readings would be necessary to determine the optimal focusing lens position and yet provides a more precise auto-focus result. Hence, with a hybrid auto-focus approach that combines DSAF and PDAF for a coarse search within the focusing range and CDAF for a fine search within the fine-search range determined by the coarse search would achieve precise and fast auto-focus results in a wide range of photographic conditions. As compared with a conventional auto-focus process in a macro scene mode which may take up to 800 ms-1 sec, the proposed method could reduce the entire auto-focus process to 200 ms or so. The following embodiments are included to demonstrate the proposed auto-focus method for capturing a still image and a video stream with more particularity.

Figure 4:
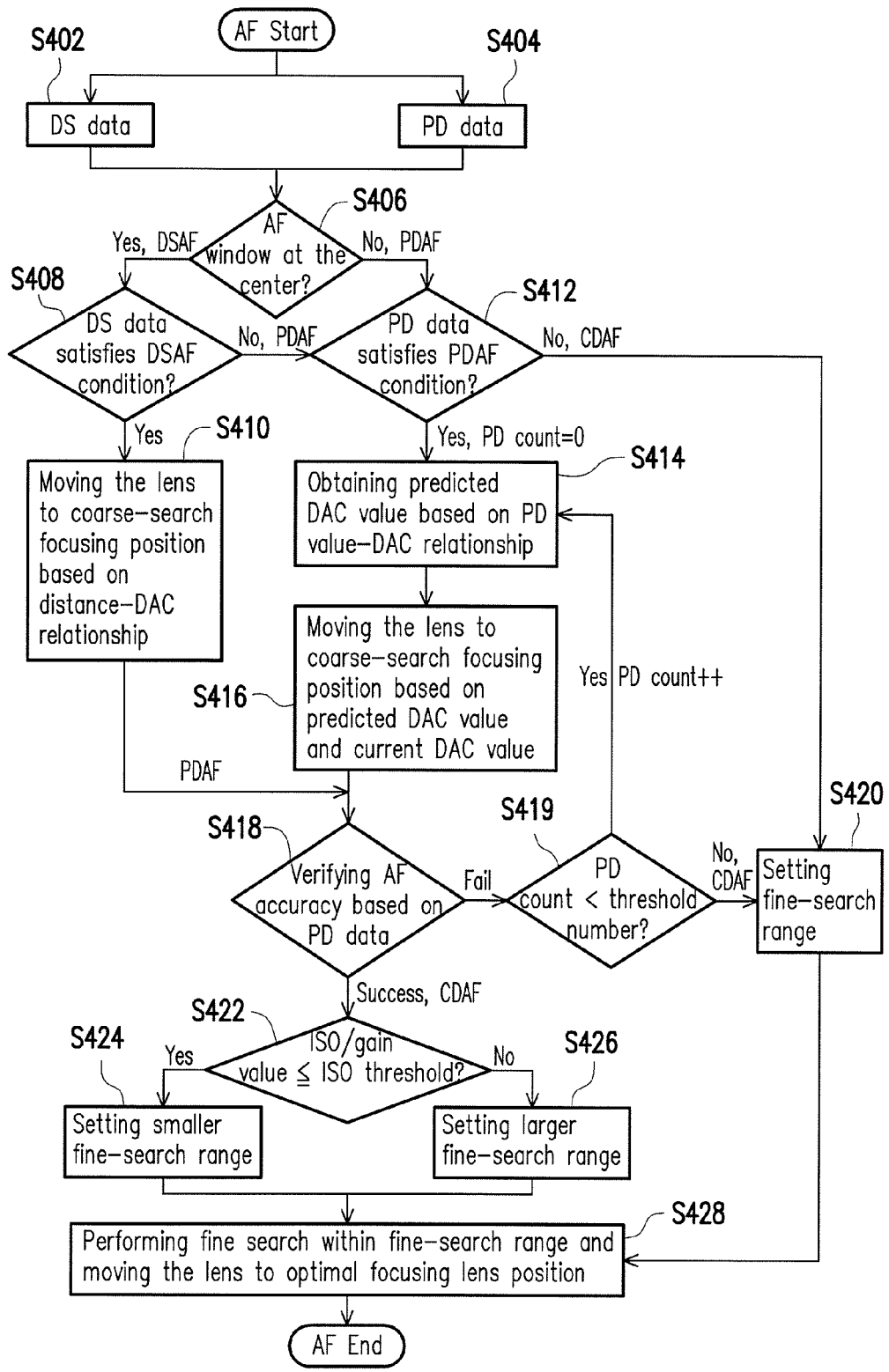
FIG. 4 illustrates a flowchart of an auto-focus method upon capturing a still image in accordance with one of the exemplary embodiments of the disclosure.

FIG. 4 illustrates a flowchart of an auto-focus method upon capturing a still image in accordance with one of the exemplary embodiments of the disclosure. The method in the present exemplary embodiment may also be implemented by the electronic device 100 in FIG. 1.

Referring to FIG. 4, after an auto-focus process is initiated, the processor 40 obtains DS data by using the distance sensor 20 (Step S402) and PD data by using the image sensor 10 (Step S404). Detailed steps for obtaining the DS data and the PD data may refer to the related description in Step S302 and Step S304 as explained in the previous paragraphs and would not be repeated herein.

Next, the processor 40 determines whether an auto-focus window is located at the center of a target scene (Step S406), where the auto-focus window is usually a rectangle. This can be done by determining whether the coordinates of the auto-focus window are located at the center or other positions at the corners of the target scene.

When the processor 40 determines that the auto-focus window is located at the center of the target scene, there would be a high possibility that the target object is located within a short distance from the image sensor 10. The processor 40 would switch the image sensor 10 to the DSAF mode and then decide whether to start performing a coarse search in a focusing range by determining whether the DS data satisfies a DSAF condition (Step S408). The determination could be based on an object reflectance and an object distance of the target object. In one exemplary embodiment, the processor 40 may determine whether the object reflectance exceeds a rate threshold given that the object distance is within a detecting range of the distance sensor 20. Alternatively, the processor 40 may determine whether the object distance is less than a distance threshold. For example, given that the detecting range of the distance sensor 20 is between 0 and 500 mm, the DSAF condition may be set as follows:

(Object Reflection>0.2 Mcps && (Object Distance!=0 ||Object Distance!=765 mm))||(Object Distance<500 mm)

When the determination of Step S408 is YES, it represents that the object distance is short or the object reflectance is high enough for the distance sensor auto-focus mode. Under such circumstance, the processor 40 would start performing the coarse search in the focusing range by controlling the lens 12 to move to a coarse-search focusing position based on a distance-DAC relationship stored in the memory 30 (Step S410). The distance-DAC relationship includes different code values (referred to as DAC values), where each of the DAC values is an indicative of a signal that must be applied to move the lens to a position corresponding to the object distance for auto-focus adjustment. The distance-DAC relationship may be constructed based on Table 1, where the distance-DAC relationships corresponding to object distances of 100 mm and 400 mm with respect to different lens postures are given.

TABLE 1

|  | | Lens Posture | | |
| --- | --- | --- | --- | --- |
|  | | Upward | Forward | Downward |
| 400 (mm) | 400 | 420 | 350 | 280 |
| Macro (mm) | 100 | 548 | 478 | 408 |
| mm/DAC | | −0.42667 | −0.42667 | −0.42667 |

Figure 5:
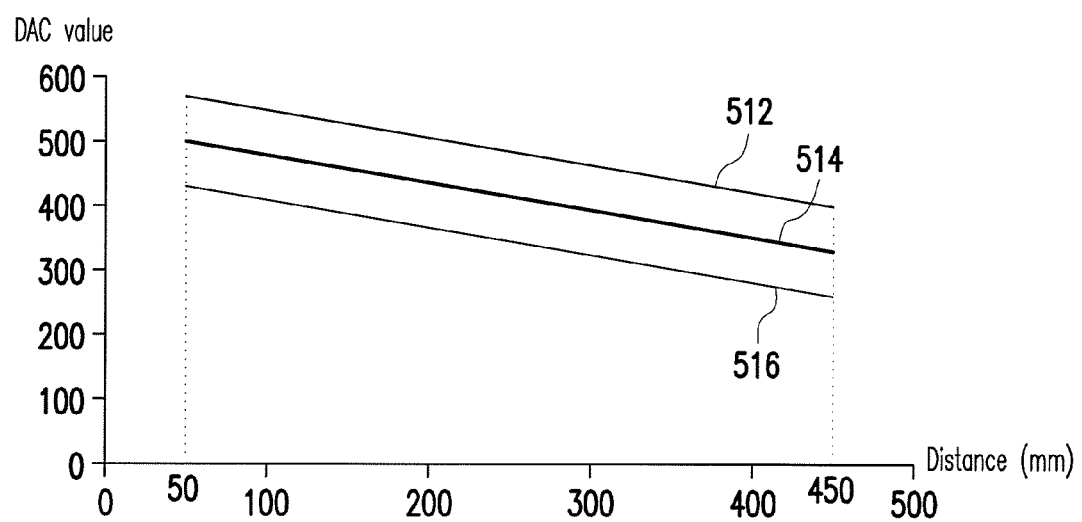
FIG. 5 illustrates a distance-DAC relationship in accordance with one of the exemplary embodiments of the disclosure.

The distance-DAC relationship corresponding to other object distances may be acquired by an interpolation method as illustrated in FIG. 5, where lines 512, 514, and 516 respectively represents the distance-DAC relationships with respect to an upward posture, a forward posture, and a downward posture of the lens 12. Once the lens 12 is moved to the coarse-search focusing position, the processor 40 would switch the image sensor 10 to the PDAF mode for auto-focus accuracy verification based on the PD data. The description of which will be provided later on.

On the other hand, when the determination of Step S408 is NO, it represents that the object distance is far or the object reflectance is too low for the DSAF mode. Under such circumstance, the processor 40 would switch the image sensor 10 to the PDAF mode and decide whether to start performing the coarse search in the focusing range by determining whether the PD data satisfies a PDAF condition (Step S412). The determination could be based on a PD value and a confidence level as described previously. In one exemplary embodiment, the processor 40 may determine whether the confidence level exceeds a level threshold. Alternatively, the processor 40 may determine whether the PD value is valid. For example, the PDAF condition may be set as follows:

Confidence Level>level threshold||PD value !=511||PD value !=−512

It should be noted that, when the processor 40 determines that the auto-focus window is not located at the center of the target scene in Step S406, the processor 40 would directly switch the image sensor 10 to the PDAF mode and perform Step S412.

When the determination of Step S412 is YES, it represents that the PD data is valid for the PDAF mode. Under such circumstance, the processor 40 would obtain a predicted DAC value by inputting the PD value into a PD value-DAC relationship stored in the memory 30 (Step S414) and then control the lens 12 to move to a coarse-search focusing position based on the predicted DAC value and the current DAC value (Step S416). The PD value-DAC relationship includes different predicted DAC values, where each of the predicted DAC values corresponding to a PD value for auto-focus adjustment. In other words, the summation of the current DAC value and the predicted DAC value corresponds to the coarse-search focusing position.

Once the lens 12 is moved to the coarse-search focusing position, either from Step S410 or from Step S416, the processor 40 would verify auto-focus accuracy based on the PD data (Step S418) and the number of PD count (Step S419), where the PD count is the number of iterations where Step S414 and Step S416 are performed. When the PD value fails the auto-focus accuracy verification and yet the PD count does not exceed the threshold number, the processor 40 may return to Step S414. For example, the processor 40 may perform auto-focus accuracy verification and the number of PD count based on the following expression:

(PD value<1 PD pixel) && (PD count<3)

When the verification fails (e.g. when PD count>2), it represents that the processor 40 may not be able to find the accurate coarse-search focusing position within certain number of iterations, the processor 40 would switch the image sensor 10 to the CDAF mode by first setting a fine-search range for the CDAF mode (Step S420). For example, the processor 40 may set the search range from 500 mm to infinity. It should also be noted that, when the determination of Step S412 is NO, it represents that the PD data is invalid for the PDAF mode, the processor 40 would also perform Step S420 to switch the image sensor 10 to the CDAF mode.

On the other hand, when the verification successes, the processor 40 would set a fine search range for the CDAF mode based on ambient light. The processor 40 would first determine whether an ISO/gain value is less than or equal to an ISO threshold (e.g. 800) (Step S422). If the determination is YES (i.e. the ambient light is sufficient), the processor 40 would set a smaller fine search range for the CDAF mode (Step S424). For example, the fine search range may be ±1 PD pixel×DCC step with respect to the coarse-search focusing position. If the determination is NO (i.e. the ambient light is insufficient), the processor 40 would set a larger fine search range for the CDAF mode (Step S426) so as to compensate the inaccuracy of PDAF due to a large analog gain. For example, the fine search range may be set based on Table 2 as illustrated below:

TABLE 2

| CDAF | ISO800 | ISO1600 | ISO3200 |
|---|---|---|---|
| AF_Range | ±16 | ±32 | ±64 |
| AF_Step | 4 | 8 | 12 |

After the fine search range for the CDAF mode is set, either from Step S420, Step S424, or Step S426, the processor 40 would perform a fine search within the fine-search range and control the lens 12 to move to an optimal focusing lens position (Step S428), and the auto-focus process is then completed.

Figure 6:
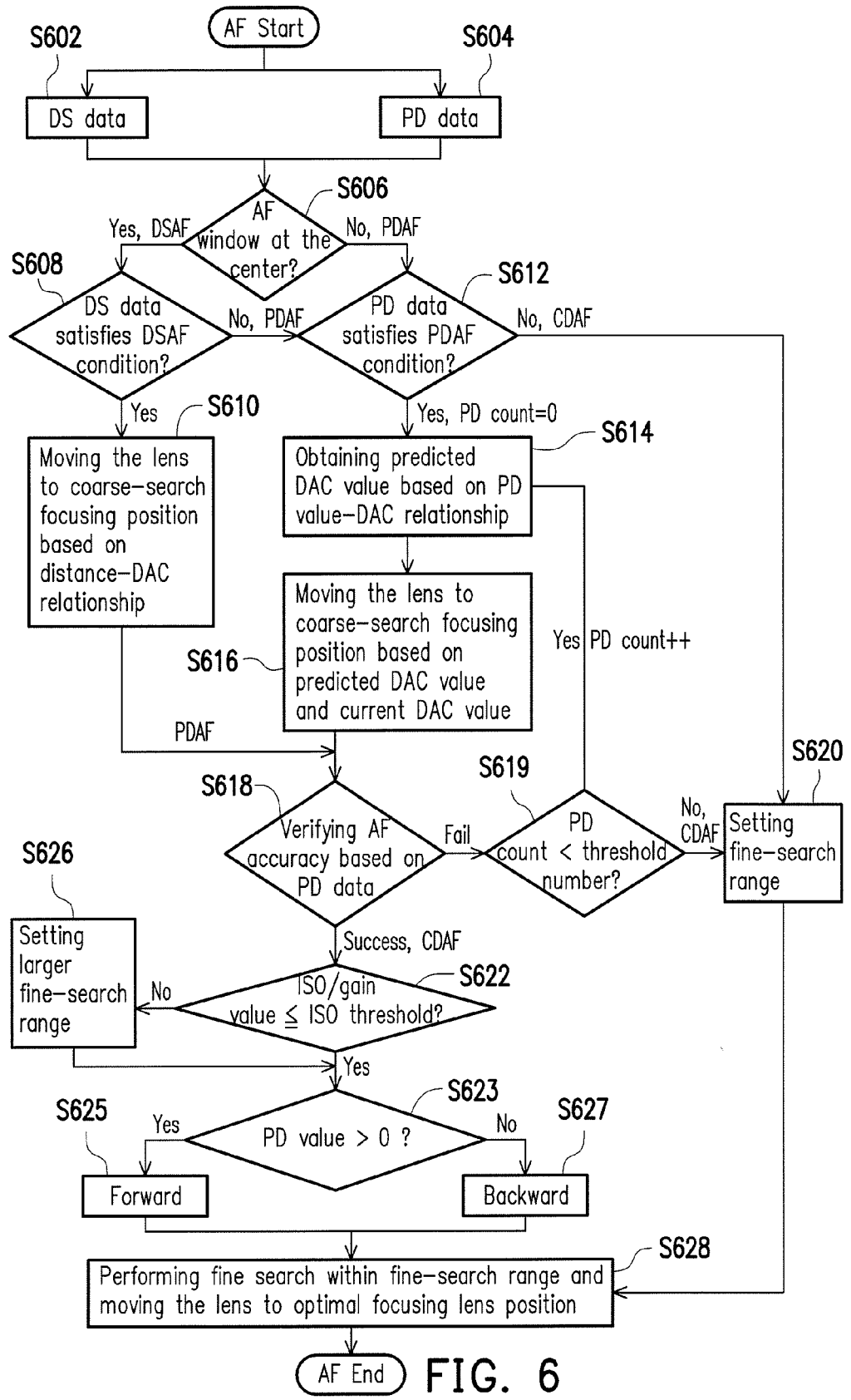
FIG. 6 illustrates a flowchart of an auto-focus method upon capturing a video stream in accordance with one of the exemplary embodiments of the disclosure.

FIG. 6 illustrates a flowchart of an auto-focus method upon capturing a video stream in accordance with one of the exemplary embodiments of the disclosure. The method in the present exemplary embodiment may also be implemented by the electronic device 100 in FIG. 1.

Referring to FIG. 6, after an auto-focus process is initiated, the processor 40 obtains DS data by using the distance sensor 20 (Step S602) and PD data by using the image sensor 10 (Step S604). Next, the processor 40 determines whether an auto-focus window is located at the center of a target scene (Step S606).

When the processor 40 determines that the auto-focus window is located at the center of the target scene, the processor 40 would switch the image sensor 10 to the DSAF mode and then decide whether to start performing a coarse search in a focusing range by determining whether the DS data satisfies a DSAF condition (Step S608).

When the determination of Step S608 is YES, the processor 40 would start performing the coarse search in the focusing range by controlling the lens 12 to move to a coarse-search focusing position based on a distance-DAC relationship stored in the memory 30 (Step S610). Once the lens 12 is moved to the coarse-search focusing position, the processor 40 would switch the image sensor 10 to the PDAF mode for auto-focus accuracy verification.

On the other hand, when the determination of Step S608 is NO, the processor 40 would switch the image sensor 10 to the PDAF mode and decide whether to start performing the coarse search in the focusing range by determining whether the PD data satisfies a PDAF condition (Step S612). It should be noted that, when the processor 40 determines that the auto-focus window is not located at the center of the target scene in Step S606, the processor 40 would directly switch the image sensor 10 to the PDAF mode and perform Step S612.

When the determination of Step S612 is YES, the processor 40 would obtain a predicted DAC value by inputting the PD value into a PD value-DAC relationship stored in the memory 30 (Step S614) and then control the lens 12 to move to a coarse-search focusing position based on the predicted DAC value and the current DAC value (Step S616). Once the lens 12 is moved to the coarse-search focusing position, either from Step S610 or from Step S616, the processor 40 would verify auto-focus accuracy based on the PD data (Step S618) and the number of PD count (Step S619). When the PD data fails the auto-focus accuracy verification and yet the PD count does not exceed the threshold number, the processor 40 may return to Step S614.

When both of the auto-focus accuracy verification fails in Step S618 and Step S619, the processor 40 would switch the image sensor 10 to the CDAF mode by first setting a fine-search range for the CDAF mode (Step S620). On the other hand, when the verification successes, the processor 40 would set a fine search range for the CDAF mode based on ambient light. The processor 40 would first determine whether an ISO/gain value is less than or equal to an ISO threshold (Step S622). If the determination is NO (i.e. the ambient light is insufficient), the processor 40 would set a larger fine search range for the CDAF mode (Step S626) so as to compensate the inaccuracy of PDAF due to a large analog gain.

Details for Steps S602-S622 and S626 may refer to the related description in S402-S422 and S426 as explained in the previous paragraphs and would not be repeated herein. Distinguished from FIG. 4, prior to a fine search, the processor 40 would determine whether to control the lens 12 to move forward or backward by determining whether the PD value is positive or negative (Step S623). In the case of capturing a near object, such that the PD value is positive, the processor 40 would control the lens 12 to start moving forward to a macro distance (Step S625). In the case of capturing a far object, such that the PD value is negative, the processor 40 would control the lens 12 to start moving backward to an infinity distance (Step S627). Once the processor 40 controls the lens 12 to start moving forward or backward, the processor 40 would perform the fine search within the fine-search range and control the lens 12 to move to an optimal focusing lens position according to the moving direction (Step S628), and the auto-focus process is then completed. It should be noted that, when the processor 40 switches the image sensor 10 to the CDAF mode in Step S620, it would directly perform Step S628.

The proposed auto-focus method could be extended from PD data to any information that describes the difference between two captured images such as disparity data. For example, FIG. 7 illustrates a schematic diagram of another image capturing device in accordance with one of the exemplary embodiments of the disclosure.

Figure 7:
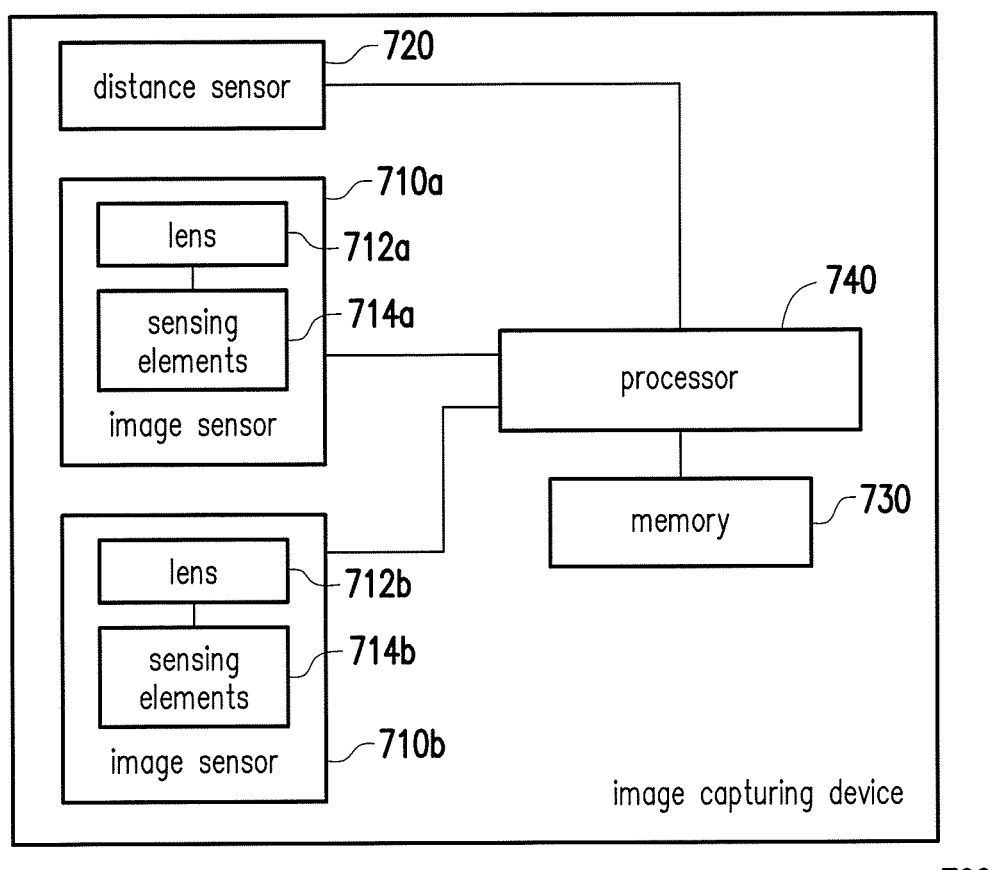
FIG. 7 illustrates a schematic diagram of another image capturing device according to an exemplary embodiment of the disclosure.

Referring to FIG. 7, a mobile electronic device 700 would include an image sensor 710a having a lens 712a and a sensing array 714a, an image sensor 710b having a lens 712b and a sensing array 714b, a distance sensor 720, a memory 730, and a processor 740, where the image sensors 710a and 710b, the distance sensor 720, and the memory 730 are respectively coupled to the processor 740, wherein similar components to FIG. 1 are designated with similar numbers having a "7" prefix.

In this instance, phase detection pixels are not necessarily to be included in the sensing arrays 714a and 714b. The processor 40 would use the disparity between two images concurrently captured by the two image sensors 710a and 710b in conjunction with DS data obtained from the distance sensor 10 as auxiliary information for speeding up the entire auto-focus process. The auto-focus process would be similar to the auto-focus method illustrated in FIG. 3, FIG. 4, and FIG. 6. The only differences are that the PD data, the PDAF condition, and PD value-DAC relationship would be replaced by disparity data, disparity data verification, and disparity-DAC relationship.

Figure 8:
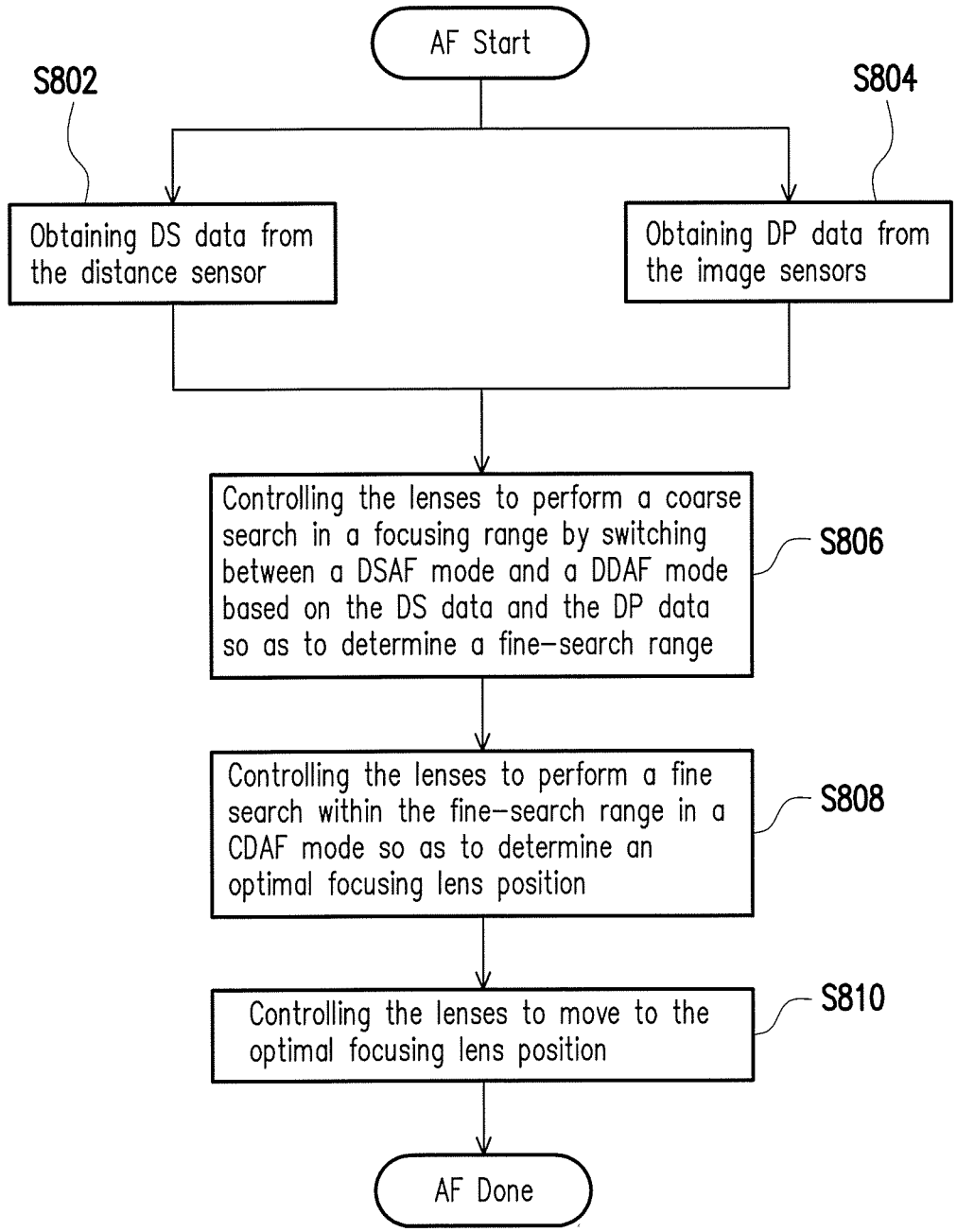
FIG. 8 illustrates a flowchart of an auto-focus method in accordance with one of the exemplary embodiments of the disclosure.

For example, FIG. 8 illustrates a flowchart of an auto-focus method in accordance with one of the exemplary embodiments of the disclosure.

Referring to FIG. 8, after an auto-focus process is initiated, the processor 40 obtains DS data from the distance sensor 720 (Step S802) and disparity data (DD data) according to the image sensors 710a and 710b (Step S804). To be specific, when the user of the image capturing device 700 wishes to take an image of a target scene and presses on an image capturing trigger, the processor 740 would control the distance sensor 720 to emit infrared light toward a target object in the target scene and receive the reflected infrared light from the target object and thereby obtain the DS data. The DS data may include an object distance as well as an object reflectance. Concurrently, the processor 740 would obtain the DD data corresponding to the disparity between the image data generated by the sensing array 714a and 714b.

Herein, the DS data and the DD data are used as auxiliary information for speeding up the entire auto-focus process. That is, the processor 740 controls the lenses 712a and 712b to perform a coarse search within a focusing range by switching the image sensors 710a and 710b between a DSAF mode and a disparity detection auto-focus (DDAF) mode based on the DS data and the DD data so as to determine a fine-search range (Step S806). The DSAF mode corresponding to the distance sensor 720 may work efficiently and provide precise measurement for a short-distance target object. On the other hand, the DDAF mode corresponding to the disparity between the two images generated by the two image sensors 710a and 710b may be relatively suitable for a long-distance target object. The collaboration of the two auto-focus modes would enable the lenses 712a and 712b to scan through the entire focusing range with large steps to first determine the coarse-search focusing position and then identify the fine-search range in which an optimal-focusing lens position is located according to the coarse-search focusing position. After the fine-search range is determined, the processor 740 would control the lenses 712a and 712b to perform a fine search within the fine-search range in a CDAF mode so as to determine an optimal focusing lens position (Step S808). Next, the processor 740 would control the lenses 712a and 712b to move to the optimal focusing lens position (Step S810), and the auto-focus process is then completed.

In view of the aforementioned descriptions, the collaboration of the two auto-focus modes based on the data obtained from the image sensor and the distance sensor would enable the lens to scan through the entire focusing range with larger steps. Once the fine-search range in which an optimal-focusing lens position is located, the lens is controlled to search for the optimal focusing lens position with smaller steps. The proposed hybrid auto-focus method is used for efficiently speed up the auto-focus procedure so as to greatly enhance user experience.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An auto-focus method, adapted to an image capturing device comprising a distance sensor and an image sensor having a lens and a sensing array, comprising the following steps:

obtaining distance sensor data (DS data) and phase detection data (PD data) respectively from the distance sensor and the sensing array;

controlling the lens to perform a coarse search in a focusing range by switching the image sensor between a distance sensor auto-focus (DSAF) mode and a phase detection auto-focus (PDAF) mode based on the DS data and the PD data so as to determine a fine-search range;

controlling the lens to perform a fine search within the fine-search range in a contrast detection auto-focus (CDAF) mode so as to determine an optimal focusing lens position; and controlling the lens to move to the optimal focusing lens position.

2. The auto-focus method according to claim 1, wherein after the step of obtaining the DS data and the PD data respectively from the distance sensor and the sensing array, the auto-focus method further comprises the following steps:

determining whether an auto-focus window is located at a center of a target scene comprising a target object;

if the auto-focus window is not located at the center of the target scene, switching the image sensor to the PDAF mode; and if the auto-focus window is located at the center of the target scene, switching the image sensor to the DSAF mode.

3. The auto-focus method according to claim 2, wherein when the image sensor is switched to the DSAF mode and before the fine-search range is determined, the step of controlling the lens to perform the coarse search in the focusing range by switching the image sensor between the DSAF mode and the PDAF mode based on the DS data and the PD data comprises:

determining whether the DS data satisfies a DASF condition, wherein the DASF condition is associated with an object reflection and an object distance of the target object;

if the DS data does not satisfy the DASF condition, switching the image sensor to the PDAF mode; and if the DS data satisfies the DSAF condition, performing a DSAF process by controlling the lens to move to the coarse-search focusing position based on a distance-digital-to-analog-converter (distance-DAC) relationship and switching the image sensor to the PDAF mode.

4. The auto-focus method according to claim 2, wherein when the image sensor is switched to the PDAF mode and before the fine-search range is determined, the step of controlling the lens to perform the coarse search in the focusing range by switching the image sensor between the DSAF mode and the PDAF mode based on the DS data and the PD data comprises:

determining whether the PD data satisfies a PDAF condition, wherein the PDAF condition is associated with a PD value and a confidence level of the PD data;

if the PD data does not satisfy the PDAF condition, switching the image sensor to the CDAF mode; and if the PD data satisfies the PDAF condition, performing a PDAF process by obtaining a predicted digital-to-analog-converter (DAC) value based on a PD value-DAC relationship and controlling the lens to move to the coarse-search focusing position based on the predicted DAC value and a current DAC value.

5. The auto-focus method according to claim 4, wherein before the fine-search range is determined, the step of controlling the lens to perform the coarse search in the focusing range by switching the image sensor between the DSAF mode and the PDAF mode based on the DS data and the PD data, the auto-focus method further comprises the following steps:

obtaining updated PD data from the sensing array;

verifying an auto-focus accuracy based on the updated PD data; and if the auto-focus accuracy is verified as accurate, setting switching the image sensor to the CDAF mode to determine the fine-search range.

6. The auto-focus method according to claim 5, wherein when the auto-focus accuracy is verified as inaccurate, the auto-focus method further comprises the following steps:

determining whether a current PD count is less than a PD count threshold, wherein the current PD count is the number of times that the PDAF process has been performed;

if the current PD count is less than the PD count threshold, incrementing the current PD count by one and re-performing the PDAF process;

if the current PD count is not less than the PD count threshold, switching the image sensor to the CDAF mode.

7. The auto-focus method according to claim 1, wherein when a coarse-search focusing position exists in the focusing range, the step of determining the fine-search range comprises:

setting the fine search range with respect to the coarse-search focusing position.

8. The auto-focus method according to claim 7, wherein the step of determining the fine-search range further comprises the following steps:

determining whether an ISO/gain value is less than or equal to an ISO threshold;

if the ISO/gain value is less than or equal to the ISO threshold, decrementing the fine-search range; and if the ISO/gain value is not less than or equal to the ISO threshold, incrementing the fine-search range.

9. The auto-focus method according to claim 7, wherein while the image capturing device is capturing a video stream, after the fine-search range is set, the auto-focus method further comprises the following steps:

obtaining updated PD data from the sensing array and determining whether the updated PD data is greater than zero;

if the updated PD data is greater than zero, controlling the lens to move forward; and if the updated PD data is not greater than zero, controlling the lens to move backward.

10. An image capturing device comprising:

a distance sensor, configured for distance detection;

an image sensor, comprising a lens and a sensing array, wherein the sensing array comprises a plurality of pixels, and wherein a part of the pixels are configured as partially-shielded phase detection pixels for phase detection;

a memory; and a processor, coupled to the distance sensor, the image sensor, and the memory, and configured for obtaining distance sensor data (DS data) and phase detection data (PD data) respectively from the distance sensor and the sensing array, controlling the lens to perform a coarse search a focusing range by switching the image sensor between a distance sensor auto-focus (DSAF) mode and a phase detection auto-focus (PDAF) mode based on the DS data and the PD data so as to determine a fine-search range, controlling the lens to perform a fine search within the fine-search range in a contrast detection auto-focus (CDAF) mode so as to determine an optimal focusing lens position, and controlling the lens to move to the optimal focusing lens position.

11. The image capturing device according to claim 10, wherein after the processor obtains the DS data and the PD data respectively form the distance sensor and the sensing array, the processor is further configured for:

determining whether an auto-focus window is located at a center of a target scene comprising a target object;

if the auto-focus window is not located at the center of the target scene, switching the image sensor to the PDAF mode; and if the auto-focus window is located at the center of the target scene, switching the image sensor to the DSAF mode.

12. The image capturing device according to claim 11, wherein the memory stores a distance-digital-to-analog-converter (distance-DAC) relationship, and wherein when the image sensor is switched to the DSAF mode and before the fine-search range is determined, the processor is configured for:
  determining whether the DS data satisfies a DASF condition, wherein the DASF condition is associated with an object reflection and an object distance of the target object;
  if the DS data does not satisfy the DASF condition, switching the image sensor to the PDAF mode; and
  if the DS data satisfies the DASF condition, performing a DSAF process by controlling the lens to move to the coarse-search focusing position based on the distance-DAC relationship and switching the image sensor to the PDAF mode.

13. The image capturing device according to claim 11, wherein the memory stores a PD value-DAC relationship, and wherein when the image sensor is switched to the PDAF mode and before the fine-search range is determined, the processor is configured for:
  determining whether the PD data satisfies a PDAF condition, wherein the PDAF condition is associated with a PD value and a confidence level of the PD data;
  if the PD data does not satisfy the PDAF condition, switching the image sensor to the CDAF mode; and
  if the PD data satisfies the PDAF condition, performing a PDAF process by obtaining a predicted digital-to-analog-converter (DAC) value based on the PD value-DAC relationship and controlling the lens to move to the coarse-search focusing position based on the predicted DAC value and a current DAC value.

14. The image capturing device according to claim 13, wherein before the fine-search range is determined, the processor is further configure for:
  obtaining updated PD data from the sensing array;
  verifying an auto-focus accuracy based on the updated PD data; and
  if the auto-focus accuracy is verified as accurate, setting switching the image sensor to the CDAF mode to determine the fine-search range.

15. The image capturing device according to claim 14, wherein when the auto-focus accuracy is verified as inaccurate, the processor is further configured for:
  determining whether a current PD count is less than a PD count threshold, wherein the current PD count is the number of times that the PDAF process has been performed;
  if the current PD count is less than the PD count threshold, incrementing the current PD count by one and re-performing the PDAF process;
  if the current PD count is not less than the PD count threshold, switching the image sensor to the CDAF mode.

16. The image capturing device according to claim 10, wherein when a coarse-search focusing position exists in the focusing range, the processor is configured for setting the fine search range with respect to the coarse-search focusing position.

17. The image capturing device according to claim 16, wherein the processor is further configured for:
  determining whether an ISO/gain value is less than or equal to an ISO threshold;
  if the ISO/gain value is less than or equal to the ISO threshold, decrementing the fine-search range; and
  if the ISO/gain value is not less than or equal to the ISO threshold, incrementing the fine-search range.

18. The image capturing device according to claim 16, wherein when the image capturing device is capturing a video stream, after the fine-search range is set, the processor is further configured for:
  obtaining updated PD data from the sensing array and determining whether the updated PD data is greater than zero;
  if the updated PD data is greater than zero, controlling the lens to move forward; and
  if the updated PD data is not greater than zero, controlling the lens to move backward.

19. An auto-focus method, adapted to an image capturing device comprising two image sensors, wherein each of the image sensors comprises a lens and a sensing array, and wherein the auto-focus method comprises the following steps:
  obtaining distance sensor data (DS data) from a distance sensor and disparity data (DP data) from the sensing arrays of the image sensors;
  controlling the lens to perform a coarse search within a focusing range by switching the image sensors between a distance sensor auto-focus (DSAF) mode and a disparity detection auto-focus (DDAF) mode based on the DS data and the DP data so as to determine a coarse-search focusing position;
  setting a fine-search range according to the coarse-search focusing position;
  controlling the lens to perform a fine search within the fine-search range in a contrast detection auto-focus (CDAF) mode so as to determine an optimal focusing lens position; and
  controlling the lenses to move to the optimal focusing lens position.

* * * * *